United States Patent
De Matos et al.

(10) Patent No.: US 11,352,987 B2
(45) Date of Patent: Jun. 7, 2022

(54) EXHAUST VALVE FOR A MOTOR VEHICLE

(71) Applicant: FAURECIA SYSTEMES D'ECHAPPEMENT, Nanterre (FR)

(72) Inventors: Raphaël De Matos, Saone (FR); Maxime Esnault, Mandeure (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/115,910

(22) Filed: Dec. 9, 2020

(65) Prior Publication Data
US 2021/0180546 A1 Jun. 17, 2021

(30) Foreign Application Priority Data
Dec. 13, 2019 (FR) ...................... 19 14361

(51) Int. Cl.
| F02M 26/70 | (2016.01) |
| F16K 27/02 | (2006.01) |
| F16K 1/22  | (2006.01) |
| F16K 1/18  | (2006.01) |
| F02D 9/10  | (2006.01) |
| F02D 9/04  | (2006.01) |

(52) U.S. Cl.
CPC ......... *F02M 26/70* (2016.02); *F16K 27/0218* (2013.01); *F02D 9/04* (2013.01); *F02D 9/1045* (2013.01); *F16K 1/18* (2013.01); *F16K 1/22* (2013.01)

(58) Field of Classification Search
CPC ...... F16K 27/0218; F16K 1/22; F02D 9/1045; F02M 26/70
See application file for complete search history.

(56) References Cited

U.S. PATENT DOCUMENTS

| 5,979,871 A  | * | 11/1999 | Forbes   | ................. | F02D 9/1045 |
|              |   |         |          |                   | 123/337     |
| 6,338,467 B1 | * | 1/2002  | Mabboux  | .............     | F16K 1/2263 |
|              |   |         |          |                   | 251/305     |
| 7,055,800 B2 | * | 6/2006  | Nakamura | ...........       | F02D 9/1045 |
|              |   |         |          |                   | 123/337     |

FOREIGN PATENT DOCUMENTS

| DE | 2427995 A1 | 1/1976  |
| EP | 0424197 A1 | 4/1991  |
| EP | 0947681 A2 | 10/1999 |
| EP | 2042708 A1 | 4/2009  |

OTHER PUBLICATIONS

Machine translation of EP0424197A1 (Year: 1991).*

(Continued)

*Primary Examiner* — Michael R Reid
(74) *Attorney, Agent, or Firm* — Carlson, Gaskey & Olds, P.C.

(57) ABSTRACT

An automobile exhaust valve is provided, in particular for an automobile combustion engine and more particularly for an embodiment of an implementation of a gas passage shutter. A valve body defines a gas circulation passage along a longitudinal axis and is composed of only two identical half-bodies whose axes, parallel to the longitudinal axis, are offset radially, in order to define inside the valve body two seats on which sides of the gas passage shutter come into flat contact in a closed position. An exhaust pipe equipped with such a valve, and a vehicle equipped with such an exhaust pipe, are also provided.

6 Claims, 3 Drawing Sheets

(56) References Cited

OTHER PUBLICATIONS

French Search Report for FR Application No. 1914361 dated Aug. 24, 2020.
Written Opinion on the Patentability of the Invention for French Application No. 1914361 dated Dec. 13, 2019.

* cited by examiner

[Fig. 1]
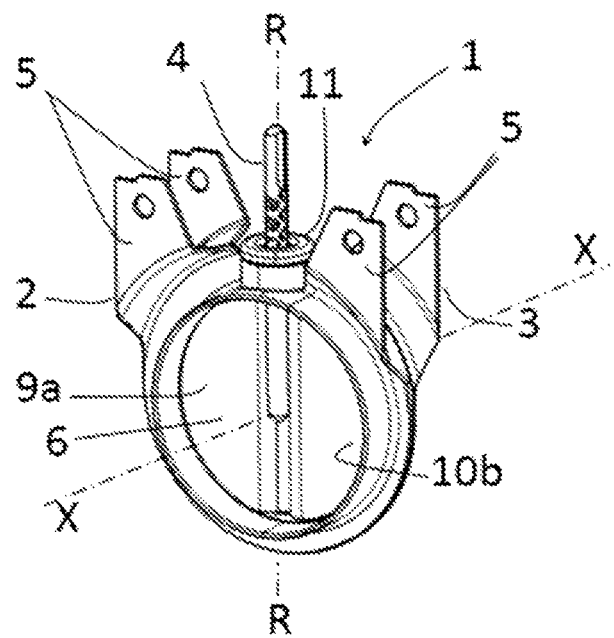
[Fig. 2]
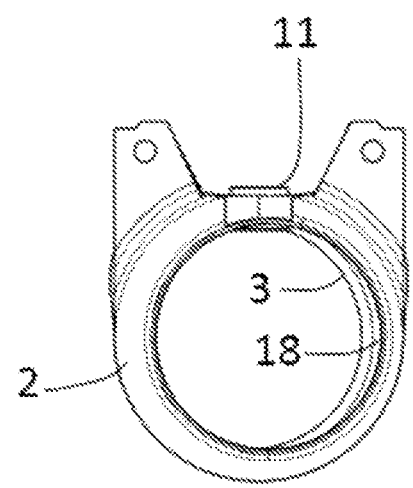

[Fig. 3]
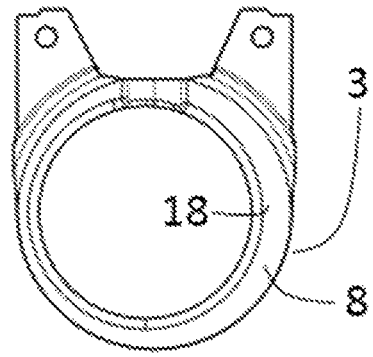
[Fig. 4]
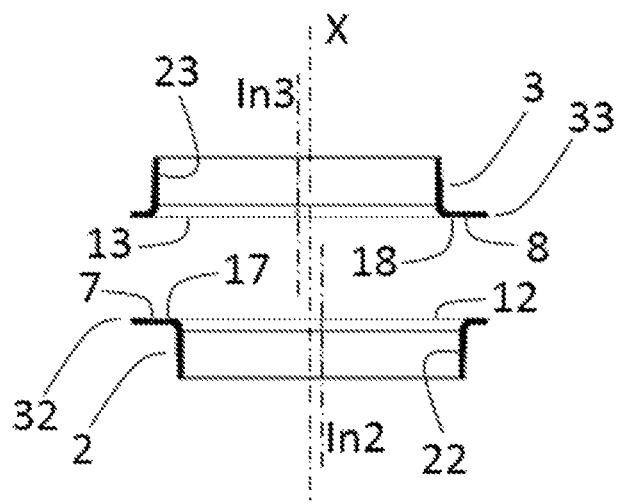
[Fig. 5]
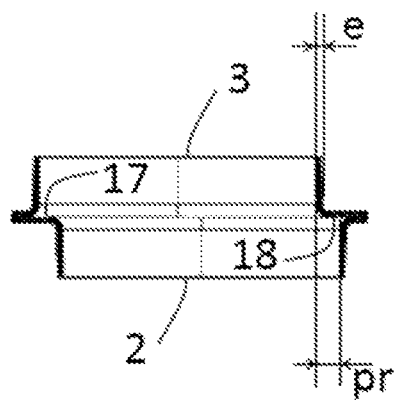

[Fig. 6]
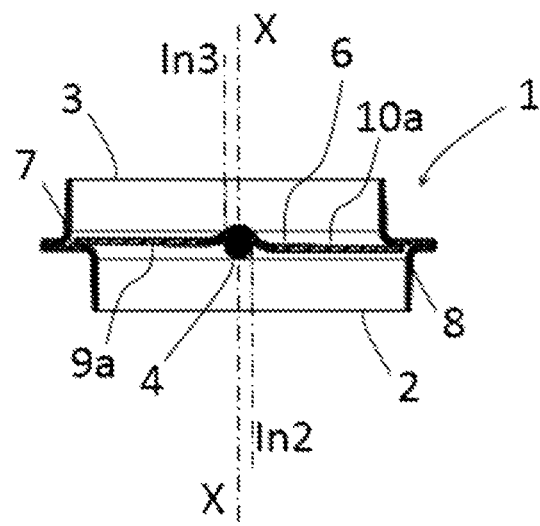
[Fig. 7]
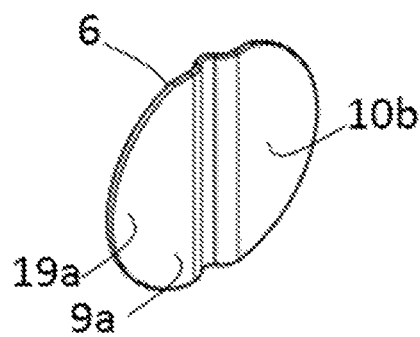
[Fig. 8]
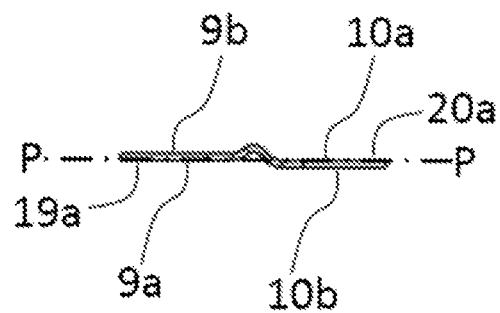

EXHAUST VALVE FOR A MOTOR VEHICLE

CROSS-REFERENCE TO RELATED APPLICATIONS

This application is a U.S. non-provisional application claiming the benefit of French Application No. 19 14361, filed on Dec. 13, 2019, which is incorporated herein by reference in its entirety.

TECHNICAL FIELD

The disclosure relates to the field of driver-operated exhaust valves, in particular for automobile combustion engines.

BACKGROUND

It is known to produce such valves comprising a cylindrical body disposed in the passage of the exhaust gases, a first cylindrical sleeve disposed in a first axial half of the cylindrical body and a second cylindrical sleeve disposed in a second axial half of the cylindrical body, a shutter in the form of a flat disk with beveled edges disposed inside the two sleeves, movable about an axis of rotation perpendicular to the axis of the gas passage between a position of closing the exhaust gas circulation passage and a position of opening the exhaust gas circulation passage. The two sleeves have axes parallel to the gas passage which are radially offset with respect to each other and each have internal faces, which abut against each other to form two shoulders inside the two sleeves, said shoulders defining a first and a second circular seat, the maximum width of which is that of the thickness of the wall of the sleeve. In the closed position, the shutter has its beveled edges resting against the edges of the first and second seats defined by the sleeves.

This embodiment has the drawbacks of high cost, due, on the one hand, to the use of three parts to form the valve body: a cylindrical body as well as two sleeves forming the stops of the shutter and, on the other hand, the need for precise and costly machining of the shutter to obtain the beveled edges.

Also, the maximum width of the seats, limited to the thickness of the wall of the sleeve, does not make it possible to ensure a sufficiently large flat contact between the stop and the shutter. This has the disadvantage of limiting the contact surface and therefore reducing the effectiveness of the seal in terms of gas tightness.

Furthermore, the contact provided between such a shoulder and a shutter with beveled edges is a linear contact which, in practice, due to the differences in shape of the parts in contact, is not very tight.

According to another embodiment, such valves include a flat seal arranged in the duct and an element for retaining the flat seal, while the shutter comprises two flat sides, in order, in the closed position, to come into flat contact with the surface of the seal. This kind of shutter may have a shape having two pairs of opposing sides, one of the pairs of opposing sides of which is parallel to the other pair of opposing sides and is in a different plane from the other pair of opposing sides. This shutter is generally obtained by adding two metal plates, fixed together for example by welding or screwing.

This embodiment has the drawback of high cost due, on the one hand, to the use of four parts to form the valve body: a cylindrical body, a seal and two sleeves enclosing the seal and, on the other hand, the need for assembly by welding and or screwing of the shutter.

This also has the drawback that the seal is liable, over the course of use in the flow of exhaust gases, the temperature of which may rise in the automotive field up to 850° C., to be subjected to thermal stresses having the consequence of deforming the seal and thus reducing the tightness of the system to zero because the flat contact between the shutter in the closed position and the seal can no longer be ensured.

Adding a seal to the interior of the valve body also has the disadvantage of requiring precise and expensive manufacturing and assembly methods.

According to yet another embodiment, such valves have bodies with seats acting as stops for the shutter, originating from a foundry or even obtained by machining.

This embodiment is very expensive and generally induces a fairly high mass of the valve.

The automotive market being more and more demanding in terms of competitiveness and reduction of pollutant emissions, it is now very important to offer products at reduced cost and mass, a problem to which the prior art cited above does not offer an answer.

SUMMARY

The disclosure provides a simplified, inexpensive, and robust design of the entire valve. To this end, the valve body defining a gas circulation passage is composed of only two identical half-bodies.

A valve for an exhaust device, comprises a valve body defining an exhaust gas circulation passage along a longitudinal axis, and a substantially flat shutter, rotating about an axis of rotation perpendicular to the longitudinal axis between a closed position of the exhaust gas circulation passage and an open position of the exhaust gas circulation passage. The flat shutter comprises two parallel sides diametrically opposed relative to the axis of rotation. The valve body comprises two identical half-bodies, disposed symmetrically to one another with respect to the axis of rotation, each half-body comprising a tubular part with a respective axis. The two half-bodies are so disposed that their respective axes are parallel to each other, and radially offset on either side of the axis of rotation. Each tubular part is terminated by a collar and the half-bodies are disposed head-to-tail so that the collars rest against each other. A part of each collar is open due to the offset between the axes, forms first and second seats diametrically opposed relative to the axis of rotation, and comprises a bearing surface comprised in the same plane.

Particular characteristics or embodiments, which may be used alone or in combination, are:
  the shutter is so shaped that each of the two sides of the shutter has respectively, in the closed position, a flat part oriented parallel to a bearing surface of a seat so as to have a flat contact with said seat bearing surface in the same plane;
  each collar comprises an outer contour centered on the longitudinal axis;
  the axes of the tubular parts are offset from each other by a distance greater than the thickness of material forming each half body;
  each half-body comprises a cut and/or stamped sheet;
  the shutter comprises a cut and/or stamped sheet.

According to a second aspect, the disclosure relates to an exhaust pipe comprising such a valve.

According to a third aspect, the disclosure relates to a vehicle comprising such an exhaust pipe.

BRIEF DESCRIPTION OF THE DRAWINGS

The disclosure will be better understood upon reading the following description, given purely by way of example, and with reference to the appended figures in which:

FIG. 1 shows a perspective view of a valve,

FIG. 2 shows a front view of a valve body without a shutter,

FIG. 3 shows a half-body seen from the back,

FIG. 4 shows a sectional view in a plane perpendicular to the axis of rotation of two half-bodies, FIG. 5 shows a sectional view in a plane perpendicular to the axis of rotation of the valve body without the shutter, FIG. 6 shows a sectional view in a plane perpendicular to the axis of rotation of the valve body with the shutter and the actuating rod, FIG. 7 shows a perspective view a shutter, and FIG. 8 shows a top view of a shutter.

DETAILED DESCRIPTION

According to a first embodiment, a valve, as illustrated in FIG. 1, comprises a valve body 1 defining an exhaust gas circulation passage along a longitudinal axis X, and a substantially flat shutter 6, rotating about an axis of rotation R perpendicular to the longitudinal axis X between a closed position of the passage for circulation of the exhaust gases where the plane of the shutter is substantially perpendicular to the axis X and an open position of the passage for circulation of the exhaust gases where the plane of the shutter is substantially parallel to the axis X. The shutter 6 comprises two sides 9a, 10a more particularly illustrated in FIG. 6, parallel and diametrically opposed relative to the axis of rotation R. The sides 9a, 10a of the shutter 6 have, as illustrated by FIGS. 7 and 8, a flat part 19a, 20a, which in the closed position of the shutter 6, respectively comes into flat contact with the bearing surface 17, 18 of the seat 7, 8. The valve body also comprises two advantageously identical half-bodies 2, 3, more particularly illustrated in FIGS. 2 and 3.

The valve 1 as illustrated also comprises a rod 4 for actuating the shutter 6, fixed to the latter at one end and driven at its other end by an actuator not shown, itself fixed to the valve body on the mounting brackets 5 and a guide bearing 11 of the rod 4 fixed between the two half-bodies 2 and 3. The fixing mentioned may be made by any method, for example welding, gluing or screwing.

The identity between the two half-bodies 2, 3 makes it possible to limit the diversity of the parts produced and thus to reduce the cost of each part by using a single tool for the manufacture of the two parts.

Advantageously, these half-bodies 2, 3 are parts, for example made of metal, stamped, and/or punched out (or by punching). This manufacturing process further reduces the cost of the valves produced. The two half-bodies 2, 3 are arranged symmetrically to each other with respect to the axis of rotation R. Each half-body 2, 3 comprises a tubular part 22, 23 with respective axis In2, In3. The two half-bodies 2, 3 are so designed that their respective axes In2, In3 are parallel to each other, and advantageously offset radially on either side of the axis of rotation R.

Again advantageously, the fact that each half-body 2, 3 is formed from a single block, increases the strength and robustness of the part as well as of the entire valve body 1.

As illustrated by FIGS. 4 and 5, each tubular part 22, 23 is terminated by a collar 12, 13. The half-bodies 2, 3 are so disposed that their collars 12, 13 bear against each other. A part of each collar 12, 13, opened by the offset between the axes In2, In3, advantageously forms a first and a second seat 7, 8 diametrically opposed relative to the axis of rotation R. Each seat 7, 8 comprises a supporting surface 17, 18, included in the same plane P.

No additional part is used to create the two seats 7, 8. This reduces the production steps and therefore the cost of the valve body 1. In addition, the seats 7, 8 thus created have a supporting surface 17, 18 advantageously flat and capable of serving as a stop for the flat part 19a, 20a of the corresponding side 9a, 10a of the shutter 6 in its closed position.

According to a second embodiment illustrated in FIG. 6, the shutter 6 is so shaped that each of the two sides 9a, 10a of the shutter 6, respectively, in the closed position, has a flat part 19a, 20a oriented parallel to a supporting surface 17, 18 of a seat 7, 8 so as to present a flat contact with said supporting surface 17, 18 in the plane P. This makes it possible to ensure an improved seal against the passage of gases.

As illustrated in FIGS. 1, 7 and 8, the shutter 6 comprises at least two diagonally opposite sides 9a, 10a, symmetrically opposed with respect to the axis of rotation R. The sides 9a, 10a advantageously have flat parts 19a, 20a included in the same plane. This conformation of the shutter 6 ensures, in the closed position, the flat contact with the supporting surfaces 17, 18 of the seats 7, 8, themselves coplanar with the plane P.

According to a third embodiment illustrated in FIG. 4, each collar 12, 13 comprises an outer contour 32, 33 centered on the longitudinal axis X, which gives it minimum bulk and allows it to be superimposed on the outer contour of the other opposite collar.

According to a fourth embodiment more particularly illustrated in FIGS. 4 and 5, the axes In2, In3 are offset from each other by a distance greater than the thickness e of material forming each half-body 2, 3.

This offset between the axes In2 and In3 is equal to the depth pr of the seats 7, 8 as illustrated in FIG. 5. The depth pr is shown greater than the thickness "e" of the material constituting the half-bodies 2 and 3, but it is also possible to envisage an embodiment where the depth pr is equal to or less than the thickness e.

Advantageously, the preferred embodiment is defined by a depth "pr" greater than the thickness "e", typically two to four times greater and preferably two to three times greater, in order to advantageously increase the contact surface between the flat part 19a, 20a of a side 9a, 10a of the shutter 6 and the supporting surface 17, 18 of a seat 7, 8, as illustrated in FIG. 6. Thus, when the shutter 6 is closed against the seats 7, 8, the tightness of the passage of gases is markedly improved.

According to a fifth embodiment and as illustrated in FIGS. 1 to 6, each half-body 2, 3 is advantageously produced by a single cut and/or stamped sheet. This production process allows the manufacture of a part of relatively limited thickness, generally less than 3 mm, preferably less than 2 mm and even more preferably less than or equal to 1.5 mm. This small thickness advantageously makes it possible to reduce the mass of the whole of the valve body 1, thus making it possible to meet the growing demand of the automotive market to reduce the mass of vehicles and therefore the level of pollutant emissions.

According to a sixth embodiment illustrated in FIG. 7, the shutter 6 is advantageously produced by a single sheet cut and/or stamped by punching, not requiring the assembly of several parts for its manufacture. This manufacturing process makes it possible to further reduce the cost of the parts produced. Furthermore, the process for obtaining the shutter 6 by stamping and or cutting allows the manufacture of a part with a relatively limited thickness, generally less than 3 mm, preferably less than 2 mm and even more preferably less than or equal to 1.5 mm. This small thickness advantageously makes it possible to reduce the mass of the whole of the valve body 1, this making it possible to meet the growing demand of the automotive market to reduce the mass of vehicles and therefore the level of pollutant emissions.

It will be noted that the disclosure is not limited to the embodiments previously described, but could take the form of various additional variants.

LIST OF REFERENCE SIGNS

1: valve body
2: half-body making up valve body 1
3: half-body making up valve body 1
4: shutter actuating rod 6
5: mounting brackets for an actuator
6: shutter
7: edge of half-body 2 defining a first seat
8: edge of half-body 3 defining a second seat
9*a*: side of shutter 6
9*b*: side of shutter 6
10*a*: side of shutter 6
10*b*: side of shutter 6
11: guide bearing for actuating rod 4
12: collar of half body 2
13: neck of half body 3
17: supporting surface of first seat 7
18: supporting surface of second seat 8
19*a*: flat part of side 9*a* of shutter 6
20*a*: flat part of side 10*a* of shutter 6
22: tubular part of half-body 2
23: tubular part of half-body 3
32: outer contour of half body 2
33: outer contour of half body 3
e: thickness of the material forming the valve half-bodies 2, 3
pr: depth of seats 7, 8
P: plane perpendicular to the longitudinal axis X, coincident with the flat parts 19*a* and 20*a* of shutter 6
R: rotation axis of shutter 6
X: exhaust gas passage axis
In2: exhaust gas passage axis defined by the tubular part 22 of the half-body 2
In3: exhaust gas passage axis defined by the tubular part 23 of the half-body 3

The invention claimed is:

1. A valve for an exhaust device, comprising:
a valve body defining an exhaust gas circulation passage along a longitudinal axis;
a flat shutter rotating about an axis of rotation perpendicular to the longitudinal axis between a closed position of the exhaust gas circulation passage and an open position of the exhaust gas circulation passage, the flat shutter comprising two sides diametrically opposed parallel relative to the axis of rotation;
the valve body comprises two identical half-bodies, disposed symmetrically to each other with respect to the axis of rotation, each half-body comprising a tubular part with a respective axis, the two identical half-bodies being arranged so that the respective axes are mutually parallel, and offset radially on either side of the axis of rotation, wherein each tubular part is terminated by a collar, wherein each half-body comprises a cut and/or stamped sheet, and wherein the half-bodies are disposed head-to-tail so that the collars rest against each other;
a part of each collar being open due to the offset between the respective axes of the tubular parts, forming a first and a second seat diametrically opposed relative to the axis of rotation, and comprising a supporting surface comprised in the same plane; and
wherein the respective axes of the tubular parts are offset from each other by a distance greater than a thickness of material forming each half-body.

2. The valve according to claim 1, wherein the flat shutter is so shaped that each of the two sides of the flat shutter has respectively, in the closed position, a flat part oriented parallel to the supporting surface of one of the first and second seats so as to have a flat contact with said supporting surface in the plane.

3. The valve according to claim 1, wherein each collar comprises an outer contour centered on the longitudinal axis.

4. The valve according to claim 1, wherein the flat shutter comprises a cut and/or stamped sheet.

5. An exhaust pipe, comprising the valve according to claim 1.

6. A vehicle, comprising the exhaust pipe according to claim 5.

* * * * *